Oct. 26, 1926.
W. C. HOWARD
TIRE PATCH
Filed Nov. 30, 1925
1,604,515
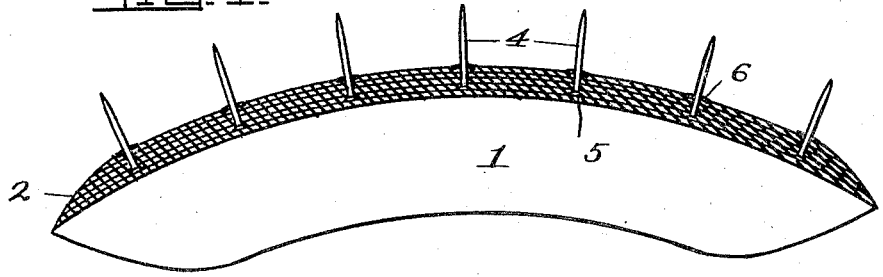
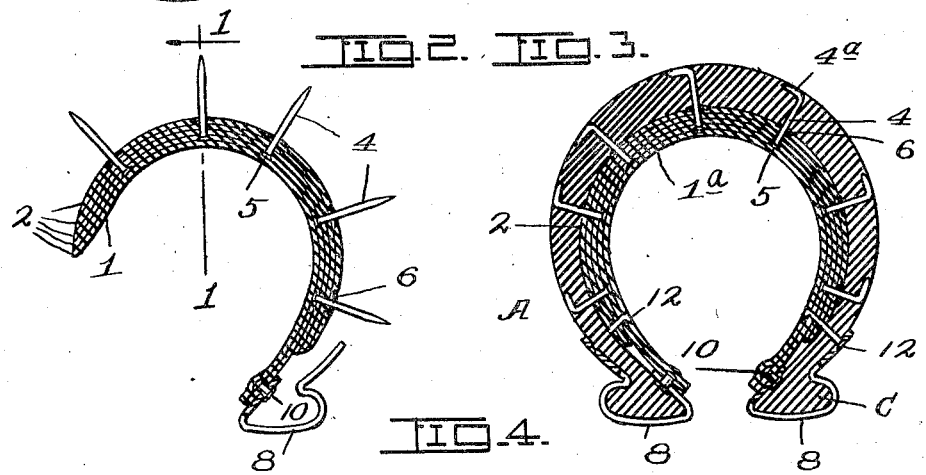
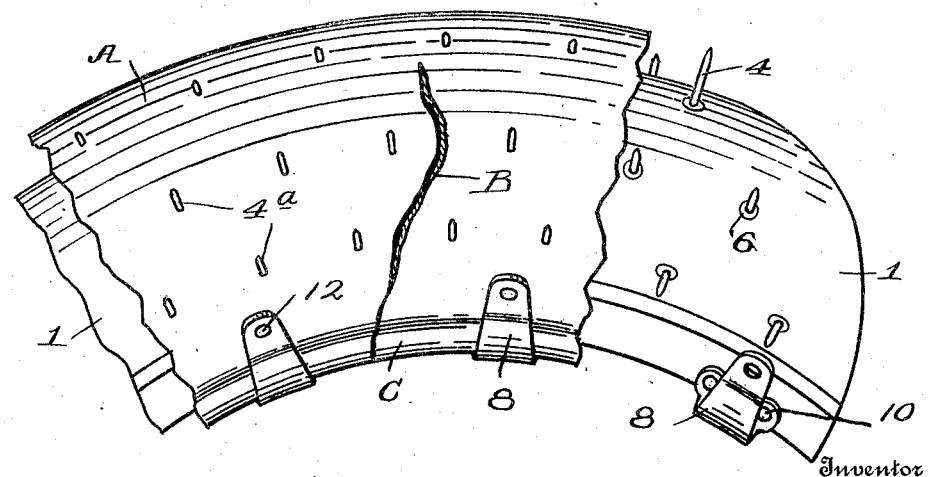
Inventor
William C. Howard,
By
F. G. Fischer,
Attorney.
Witness:
Fred G. Fischer, Patented Oct. 26, 1926.

1,604,515

UNITED STATES PATENT OFFICE.

WILLIAM C. HOWARD, OF MEXICO, MISSOURI.

TIRE PATCH.

Application filed November 30, 1925. Serial No. 72,327.

My invention relates to patches, or boots, for pneumatic tires and my chief object is to provide a device of this character whereby rim cuts and large openings in the tire casing caused, for instance by blow-outs can be reliably held in closed position against the outward pressure exerted by the inner tube when inflated, thereby eliminating all danger of said inner tube being forced into or outwardly through said openings and thus becoming ruptured.

In order that the invention may be fully understood, reference will now be had to the accompanying drawing, in which:

Fig. 1 is a longitudinal section of the patch, taken on line 1—1 of Fig. 2.

Fig. 2 is a detail cross section of the patch.

Fig. 3 is a detail cross section of another patch installed within a tire casing which is also shown in cross section.

Fig. 4 is a fragmentary side elevation of the tire casing with a patch installed therein.

Fig. 5 is a side elevation of a clip which assists in holding the patch within the tire casing and also in holding together the sides of a rim cut in a bead of the tire.

Referring now in detail to the various parts, 1 designates the body portion of the patch which may be made in various sizes to fit different sizes of tire casings A. The body portion 1 is preferably made up of one or more plies of fabric 2, firmly held together by suitable adhesive means, such for instance, as uncured rubber applied to the adjacent surfaces of said plies 2.

4 designates a plurality of pins which project through all of the plies 2, excepting the inner one which covers the heads 5 of said pins and presents a smooth surface to the inner tube, not shown. The pins 4 are reliably held in the body portion 1 by the heads 5 and disks 6, which latter are forced over the outer ends of the pins 4 and firmly against the outer ply 2. After being forced into place the disks 6 are firmly secured to the respective pins 4 by suitable means such, for instance, as electric welding.

One or both margins of the body portion 1 are provided with a plurality of clips 8, which are firmly secured in place by suitable means such as rivets 10.

In the event that the tire casing A becomes ruptured on one side as indicated at B by a blowout, glass cut, rim cut, or other cause, the patch 1 is installed within said casing in such manner that the intermediate portion of the patch will register with the opening B. The sides of the puncture B are then drawn together and the pins 4 are forced through the casing A and their ends 4ª are bent over, as shown more clearly by Figs. 3 and 4, and clenched in the outer surface of the casing A to reliably hold the patch in place and prevent it from creeping while in use. As a further precaution to prevent the patch from creeping, the clips 8, which were previously sprung over the ruptured bead C of said casing A, are firmly secured in place by suitable means, such as tacks 12, which are driven through the wall of the casing A and the body 1 and are then bent down against the inner surface of said body 1.

With the pins 4 extending through the casing A at opposite sides of the opening B, it is obvious that the sides of said opening cannot spread apart and permit the patch and the inner tube to blow out through said opening when said inner tube is inflated. It is also apparent that the clips 8 will reliably hold the cut portion of the bead C from spreading apart.

Should both beads C become cut the larger patch 1ª is employed, as it has clips 8 at each margin.

The patches are applicable to ordinary pneumatic tires as well as to balloon tires.

From the foregoing description it is apparent that I have provided a tire patch embodying the advantages above pointed out, and while I have shown and described the preferred construction, combination and arrangement of parts, I reserve the right to make such changes as properly fall within the spirit and scope of the invention as claimed.

Having thus described my invention, what I claim and desire to secure by Letters Patent, is:

1. A patch of the character described consisting of a body portion, pins projecting from said body portion and provided at their inner ends with heads, and elements forced inwardly upon said pins and engaging the outer surface of the patch.

2. A patch of the character described consisting of a body portion adapted to fit within a tire casing, pins projecting from said body portion, and clips fixed at their inner ends to the body portion and adapted to extend around the margins and outwardly a suitable distance along the outer surface of the tire casing, and elements for securing the outer ends of said clips to the tire casing and the patch.

In testimony whereof I affix my signature.

WILLIAM C. HOWARD.